United States Patent [19]
Wolff

[11] Patent Number: 5,887,355
[45] Date of Patent: *Mar. 30, 1999

[54] ATTACHMENT FOR A POWER SAW TO MAKE PLUMB CUTS

[76] Inventor: Denny Wolff, 1601 Brixham Ct., Modesto, Calif. 95358-7104

[*] Notice: The term of this patent shall not extend beyond the expiration date of Pat. No. 5,692,310.

[21] Appl. No.: 969,359

[22] Filed: Nov. 28, 1997

Related U.S. Application Data

[63] Continuation of Ser. No. 533,757, Sep. 26, 1995, Pat. No. 5,692,310.
[51] Int. Cl.⁶ ........................................... G01C 9/28
[52] U.S. Cl. .................................. 33/333; 33/334; 33/370
[58] Field of Search ............................. 33/333, 334, 354, 33/370, 371, 640

[56] References Cited

U.S. PATENT DOCUMENTS

| | | |
|---|---|---|
| 2,525,387 | 10/1950 | Volk . |
| 2,806,296 | 9/1957 | Weichert .................................. 33/334 |
| 3,052,036 | 9/1962 | Oliver ....................................... 33/334 |
| 3,664,032 | 5/1972 | Tompkins. . |
| 3,807,051 | 4/1974 | Funakubo . |
| 4,457,078 | 7/1984 | Suchy . |
| 4,546,549 | 10/1985 | Duperon .................................. 33/334 |
| 4,564,322 | 1/1986 | Stapley .................................... 33/334 |
| 5,063,679 | 11/1991 | Schwandt . |
| 5,692,310 | 12/1997 | Wolff ....................................... 33/333 |

*Primary Examiner*—Christopher W. Fulton
*Attorney, Agent, or Firm*—Dennis H. Lambert

[57] ABSTRACT

A level indicator attachment for a power hand tool to indicate the angle of inclination of the tool for making cuts at a predetermined angle. In a preferred embodiment, the level indicator comprises a circular bubble level adjustably positioned in a housing and frame mounted to the tool by use of preexisting fasteners used in assembly of the tool. Adjustment of the bubble level in the housing enables the level indicator to be calibrated or adjusted for different angle cuts. The invention is particularly suitable for use in cutting plumb cuts on rafter tails during construction of a building.

5 Claims, 5 Drawing Sheets

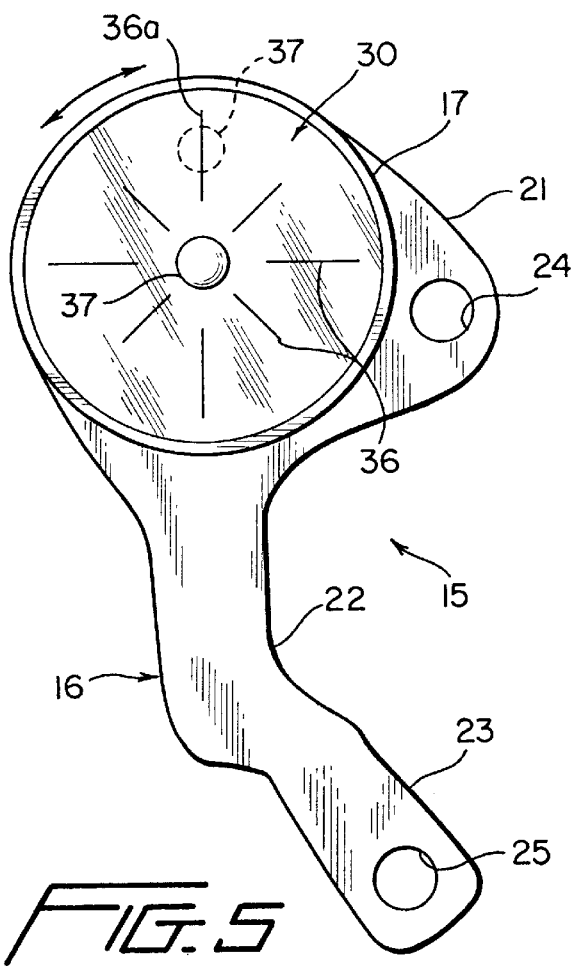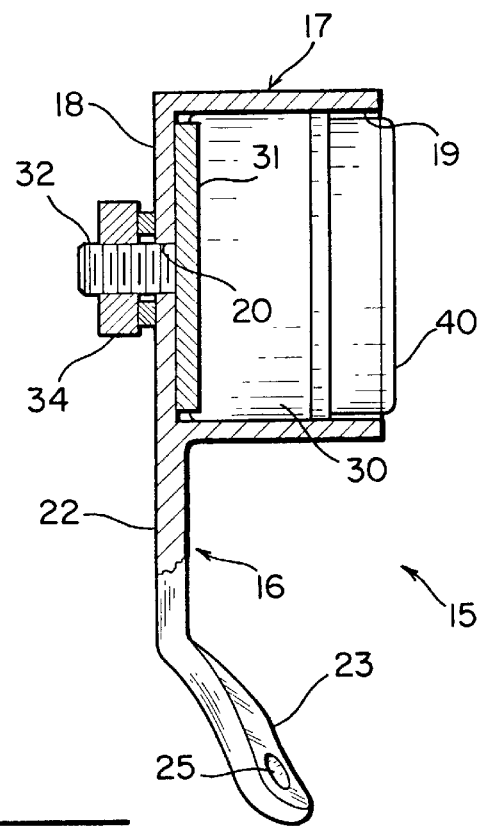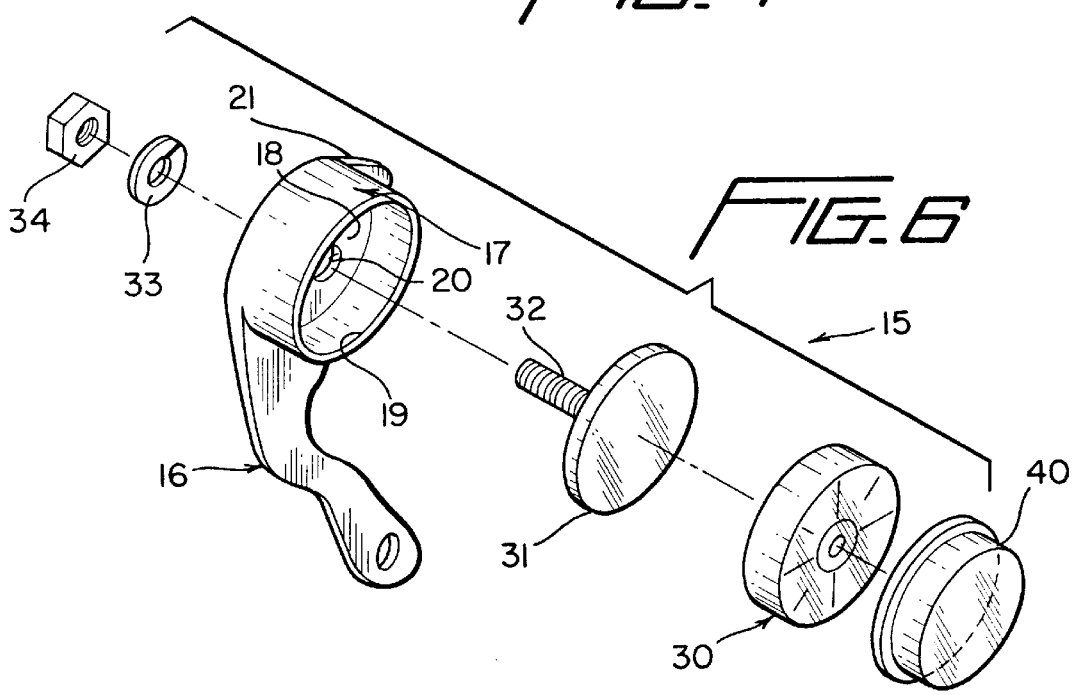

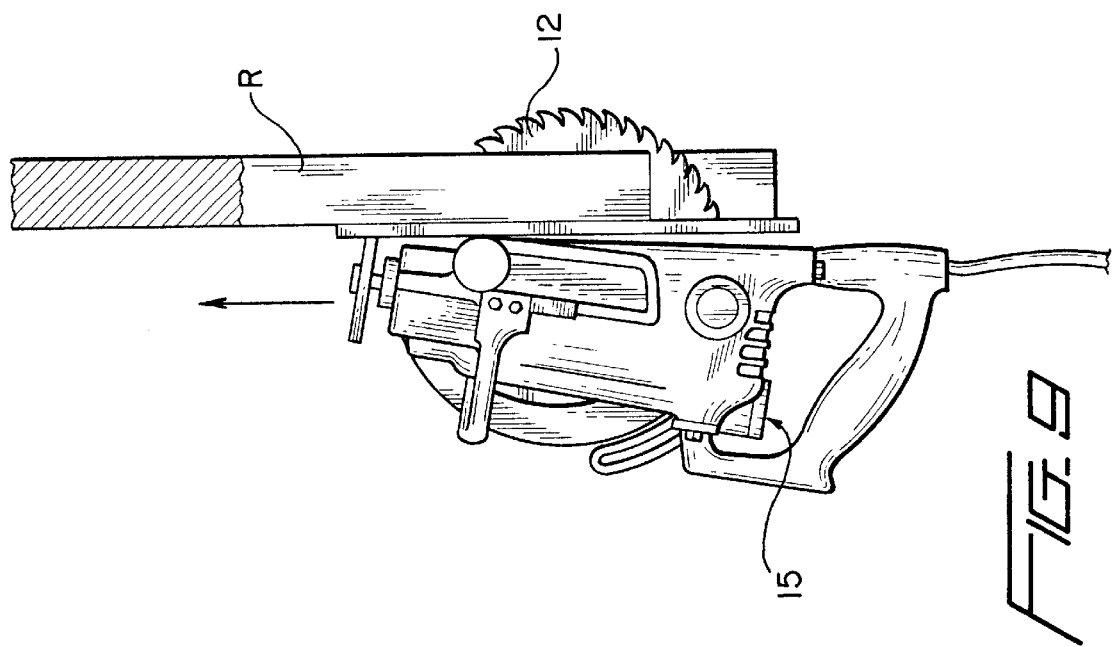
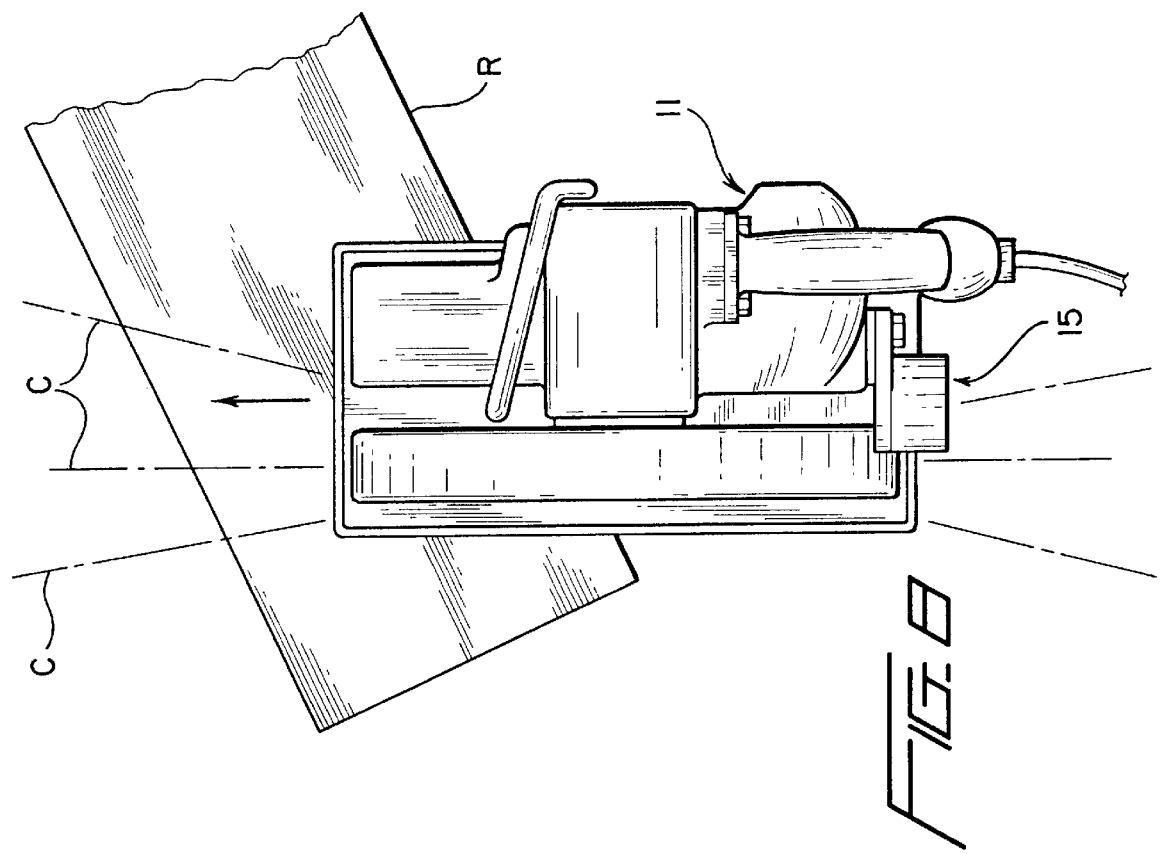

5,887,355

ATTACHMENT FOR A POWER SAW TO MAKE PLUMB CUTS

This application is a continuation of application Ser. No. 08/533,757, filed Sep. 26, 1995, now U.S. Pat. No. 5,692,310.

FIELD OF THE INVENTION

This invention relates generally to hand tools, and more particularly, relates to an attachment for a power saw to enable plumb or vertical cuts to be made without the necessity of first marking a vertical or plumb line.

BACKGROUND OF THE INVENTION

In the construction industry it is frequently necessary to make plumb cuts. For instance, during the construction of a building, carpenters and other persons working on the site measure and secure together pieces of dimension lumber to form a structure. During the course of measuring and assembling the lumber to form a structure, it may be necessary to make angled cuts in the lumber, and a variety of measuring tools are available for appropriately marking the lumber which can then be cut along the mark by using a power or hand saw.

In the construction of a roof, for example, boards are supported near their lower ends on the top edge of a wall and extend upwardly to a ridge line where they are secured to like boards extending upwardly from an opposite wall. These boards serve as rafters in the roof structure of a building. It is common practice in the prior art to install rafters with the lower or tail ends cut perpendicular to the longitudinal axis of the rafter and after all of the rafters are installed to strike a chalk line along a top or bottom edge of the rafters and then mark each rafter by using an appropriate hand tool to provide a plumb or vertical line at the lower end of each rafter. A carpenter then uses a saw to cut along the marked plumb lines to provide an appropriate angle on the tail ends of the rafters. This procedure requires several time consuming steps, adding to the cost of the project.

Similarly, it is frequently necessary to make angled cuts at the upper ends or ridge line of the rafters or in other structures, including hip-roof constructions and the like.

As presently practiced, all of these special cuts require careful measuring and marking followed by cutting along the marked lines with an appropriate tool, such as a power hand saw.

Accordingly, there is need for a device which will enable angled cuts, and especially plumb cuts, to be made without first marking a line along which the cut is to be made.

SUMMARY OF THE INVENTION

In accordance with the present invention, a simple and inexpensive attachment is provided for a cutting tool, especially a power hand saw, which enables a vertical or other angled cut to be made without first marking a line along which the cut is to be made.

In a preferred embodiment, the attachment comprises a "bulls eye" or circular level adjustably positioned in a mounting frame that is attachable to a power hand saw so that a carpenter or other person can observe the position of the bubble in the level and make a plumb cut or other angled cut without first marking a line along which the cut is to be made. Attachment of the frame of the level indicating device to the saw is made by using existing bolts or screws on the saw, which are removed and then repositioned through appropriate openings in the frame of the level indicating device.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 5 is an enlarged rear view in elevation of the level indicating attachment of the invention.

FIG. 6 is an exploded perspective view of the level indicating attachment of the invention.

FIG. 7 is a side view of the level indicating attachment, shown partially in section.

FIG. 8 is a view illustrating how a saw may be oriented to cut a rafter tail using the level indicating device of the invention.

FIG. 9 is a side view in elevation of the saw of FIG. 8, showing it being used to make a vertical cut in the tail end of a rafter.

DETAILED DESCRIPTION OF THE PREFERRED EMBODIMENTS

Figure 1:
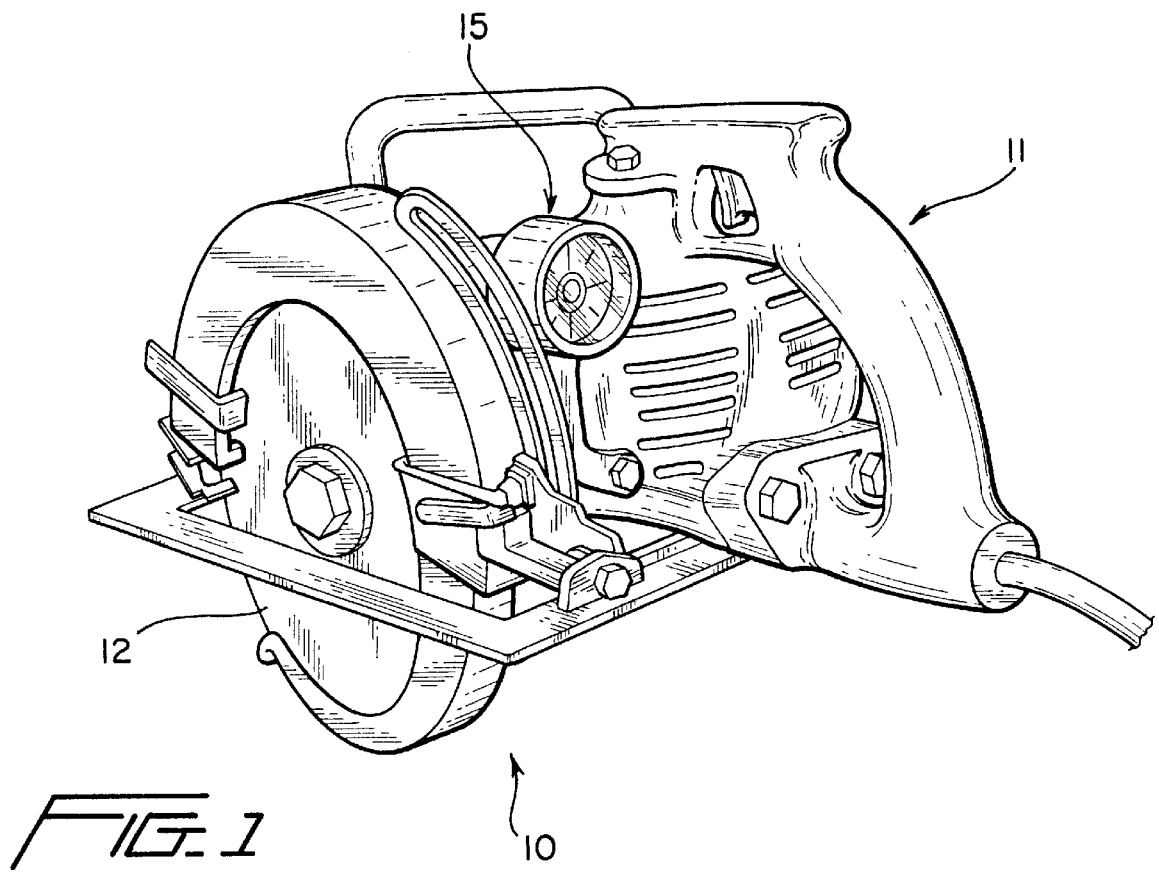
FIG. 1 is a top, rear perspective view of a power saw having the level indicating attachment of the invention affixed thereto.
Figure 2:
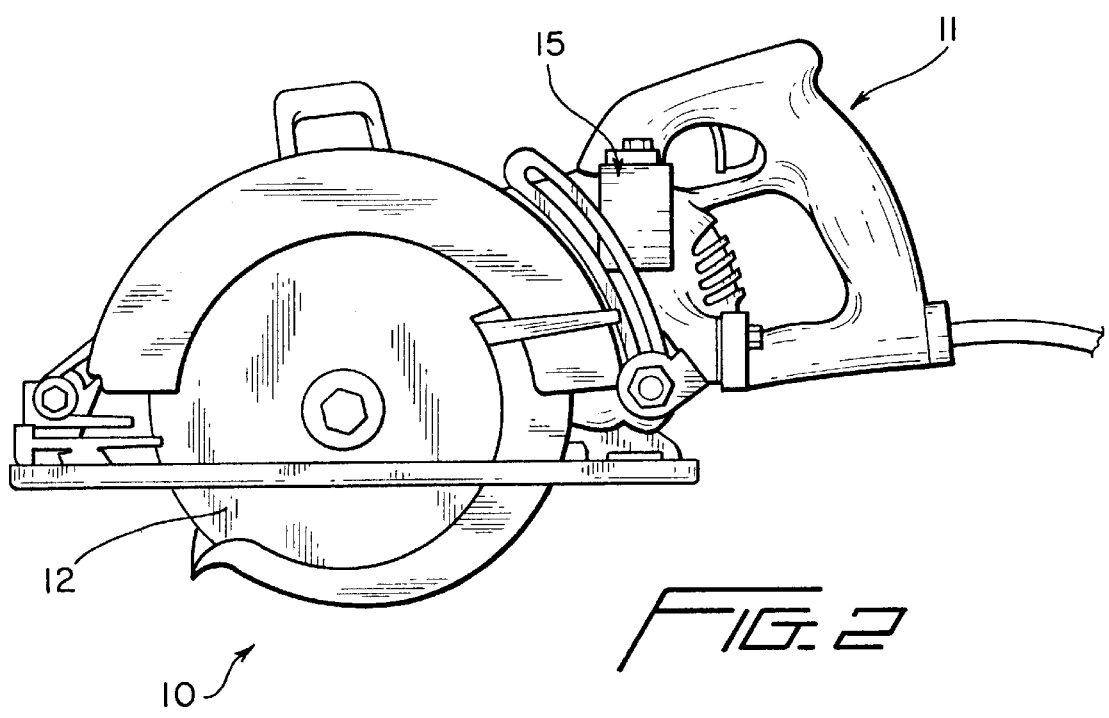
FIG. 2 is a side view in elevation of a saw such as illustrated in FIG. 1, with the level indicating attachment of the invention secured thereto.
Figure 3:
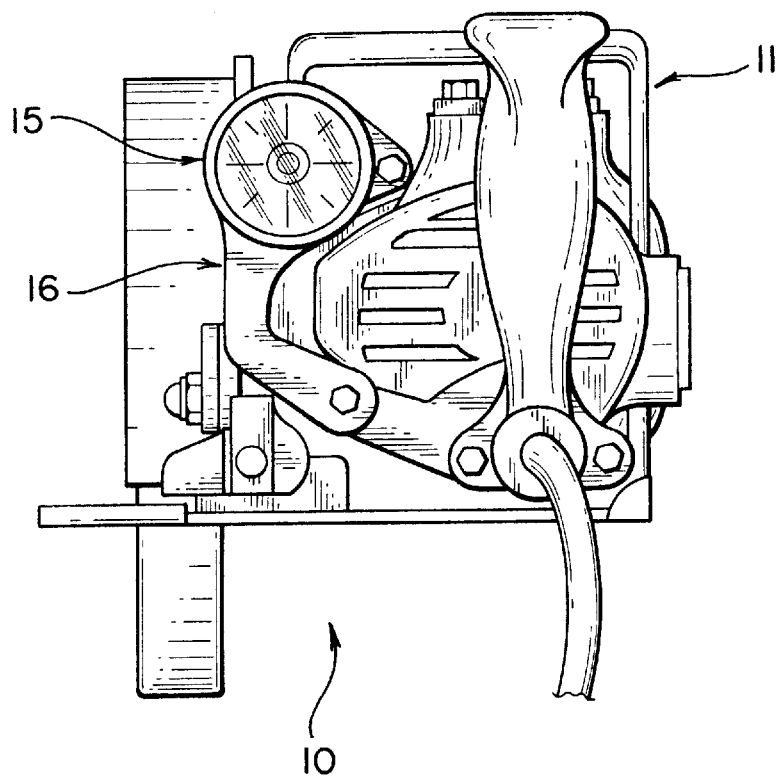
FIG. 3 is a rear view in elevation of a saw such as illustrated in FIG. 1, showing the level indicating attachment affixed thereto.

Referring more particularly to the drawings, a power hand saw having a level indicating attachment according to the invention affixed thereto is indicated generally at 10 in FIGS. 1–3, 8 and 9. A typical power hand saw without the level indicating attachment of the invention is indicated generally at 11 in FIG. 4. As specifically illustrated and described herein, the power hand saw has a circular cutting blade 12.

The level indicating attachment of the invention is indicated generally at 15, and comprises a mounting frame or bracket 16 having a cup-shaped housing 17 with an end wall 18 at its base and an open other end 19. A central opening 20 is formed through the end wall 18.

A mounting ear 21 projects radially outwardly from one side of the cup-shaped housing 17 near its base end in essentially coplaner relationship with the end wall 18, and a mounting arm 22 extends from the bottom of the cupped-shaped housing in generally coplanar relationship with the ear 21 and includes an offset end portion 23. Mounting openings 24 and 25 are formed through the ear 21 and offset portion 23, respectively. Although a particular relationship is illustrated herein between the mounting ear 21 and the arm 22, it should be understood that variations in the positional relationships of these elements can be made in order to mount the frame 16 to different saws or tools, depending upon the positioning and spacing of the bolts or screws in the saw or other tool on which the level indicating attachment 15 will be mounted.

A so-called "bulls eye" or circular level 30 is mounted in the cup-shaped housing 17 by means of a disc-shaped mounting plate 31 and bolt 32. The circular level 30 is first attached to the mounting plate 31 as by use of an adhesive or other suitable fastening means, and the bolt 32 attached to the rear of the mounting plate 31 is then extended through the opening 20 in the rear wall 18 of the cup-shaped housing 17. A lock washer 33 and nut 34 are placed on the bolt 32 on the side of wall 18 opposite the position of the mounting plate 31 to securely attach the mounting plate and thus the circular level 30 to the housing and frame 16. A transparent plastic cover 40 may be secured in the open end of the cup-shaped housing in covering relationship to the circular level 30 to protect it from dust, dirt and the like.

As seen best in FIG. 5, the face of the circular level is marked with suitable indicia 36 positioned to correspond with different angle cuts that may be made when the level indicating attachment is affixed to a saw 11. A bubble 37 is shown in full lines in FIG. 5 in the position it would normally occupy during conventional use of the circular level, with the level horizontal, and is shown in dashed lines in the position it would occupy when used in the manner contemplated by the present invention, applied to a saw 11 to make a vertical cut such as depicted in FIGS. 8 and 9.

Figure 4:
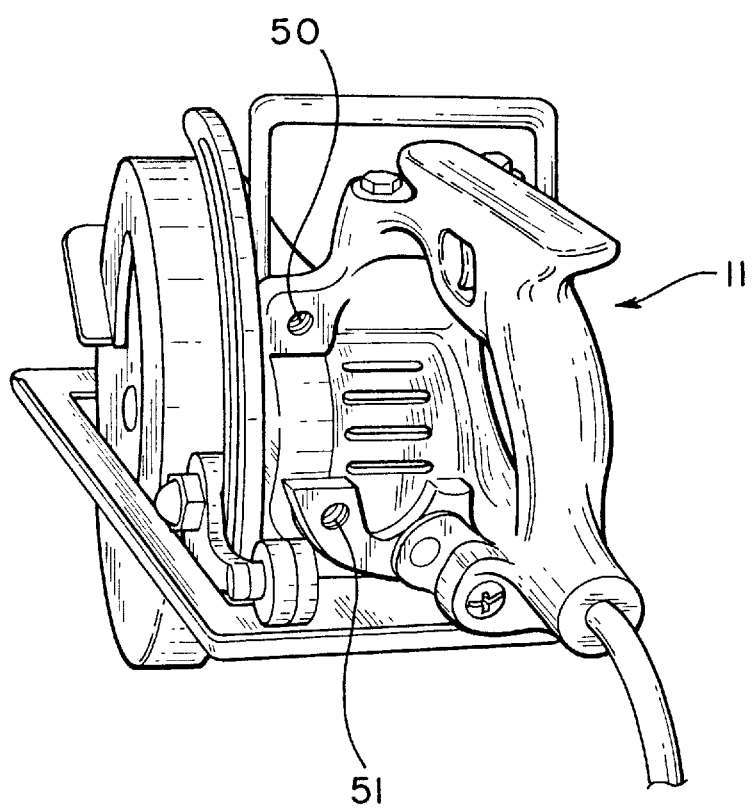
FIG. 4 is a rear perspective view of a saw such as illustrated in FIG. 1, showing the locations of bolts or screws to which the level indicating attachment of the invention may be secured.
Figure 10:
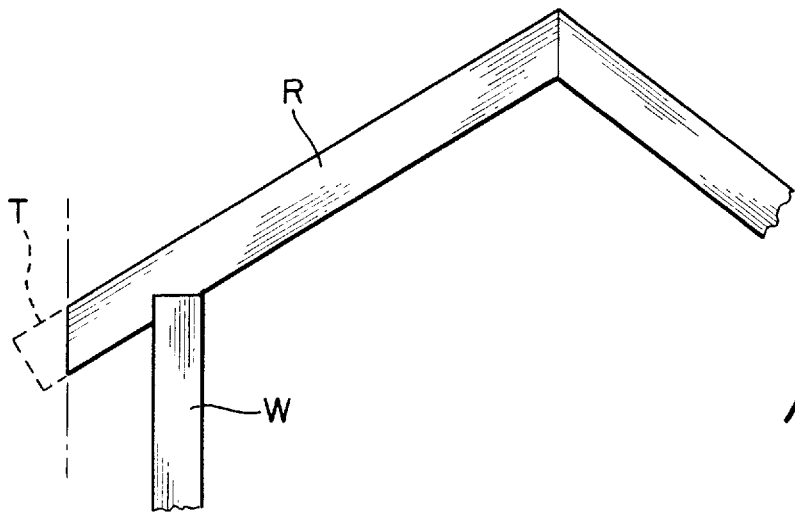
FIG. 10 is a fragmentary schematic view in end elevation showing a rafter and depicting how a plumb cut is made at the tail end of the rafter to provide a vertical surface against which facia may be attached.
Figure 11:
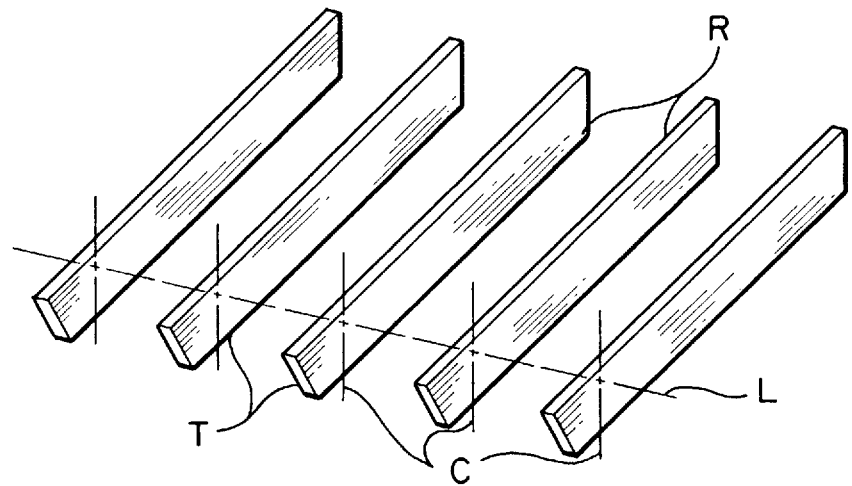
FIG. 11 is a somewhat schematic perspective view showing a plurality of rafters and how a chalk line may be struck to mark the point at which vertical cuts may be made.

As shown in FIG. 4, a typical saw 11 has structural components that include fastening bolts or screws 50 and 51 in specific locations. The locations of these bolts or screws may vary depending upon the particular make and model of a saw and a variety of differently configured attaching frames 16 may be provided to accommodate those different positions and spacings. The saw 11 shown in FIG. 4 has the bolts or screws 50 and 51 positioned appropriately for use with the frame 16 shown in FIGS. 3 and 5. Thus, the bolts or screws 50 and 51 are simply removed and the frame 16 positioned against the back of the saw, with the holes 24 and 25 aligned with the holes in which the bolts or screws 50 and 51 were originally received, and the bolts or screws then repositioned to securely fix the level indicating attachment of the invention to the saw.

The level indicating attachment of the invention may be calibrated by clamping the saw in alignment with a known vertical or plumb line, or by sinking the saw blade into a known vertical or plumb line, and then loosening the nut 34 so that the bolt 32 may be grasped with the fingers and rotated to rotate the mounting plate 31 and the circular level 30 to position the bubble 37 in centered relationship with an appropriate mark 36a. Thereafter, the nut 34 is tightened and the saw used to make vertical or plumb cuts, or other angled cuts as determined by the mark 36 or 36a that is used on the face of the circular level 30.

Accordingly, and with particular reference to FIGS. 8–11, a chalk line L may be struck across the tail ends T of rafters R and the saw 11 used to make plumb cuts C in the tail ends of the rafters without the need for marking vertical lines along which the cuts are to be made.

The frame and housing of the invention may be made of any suitable material, including 60-61 T-6 grade aluminum, and the circular level may comprise any suitable model, such as the Sears Craftsman acrylic circular level, model number 39891.

While a particular embodiment of the invention have been illustrated and described in detail herein, it should be understood that various changes and modifications may be made to the invention without departing from the spirit and intent of the invention as defined by the scope of the appended claims.

What is claimed is:

1. A level indicating device for attachment to a conventional, unmodified power hand saw to enable the saw to be used to make cuts at a predetermined angle relative to a vertical line without first having to mark a line along which the cut is to be made, comprising:

a mounting frame having means thereon for attachment of the frame to the power hand saw by receiving threaded fasteners used in the assembly of the saw;

means for movably mounting a bubble level to the frame so that the level can be adjusted relative to the frame for calibration of the level;

a circular bubble level carried by the frame in a position to be visible to a user of the power hand saw, whereby the level can be observed and by maintaining the bubble in a predetermined position the saw can be used to make a cut along a line having a predetermined angle relative to a vertical line without first having to mark a line along which the cut is to be made; and means attaching the mounting frame and bubble level in a recessed area of the power hand saw for shielding and protecting the bubble level against bumps with external objects during handling of the saw.

2. A level indicating device as claimed in claim 1, wherein:

the frame includes a cup-shaped housing having a central axis; and the circular bubble level is supported in said housing for adjustable rotation about said central axis, said bubble level having a face with indicia thereon so that the level may be adjusted to different rotational positions for cooperation of the bubble in the level with different indicia for making different angle cuts.

3. A level indicating device as claimed in claim 2, wherein:

the power hand saw has a handle on a rearward portion thereof, and a rotatable circular saw blade at one side; and the frame is mounted to the saw so that the bubble level face is in a vertical position when the saw blade is in a vertical position.

4. A level indicating device as claimed in claim 2, wherein:

the bubble level is attached to one side of a circular mounting plate that seats in the cup-shaped housing, said mounting plate having a combined attaching and calibration bolt extending from the other side thereof, said bolt being received in a central opening in the base of the cup-shaped housing and having a free end exposed at a rear surface of the cup-shaped housing and a nut engaged on the free end of the bolt to secure the mounting plate and the level to the housing.

5. In combination, a power hand saw having a circular blade, and a bubble level indicating device carried by the saw in a shielded position to enable a person using the saw to accurately visually determine the angular position of the saw blade relative to a vertical line, said saw having a housing with a handle projecting from a rear portion thereof, and a rotatable circular saw blade at one side thereof, said bubble level indicating device being attached to said rear portion of the housing adjacent said handle, shielded by the handle and adjacent components of the saw from contact with external objects during handling of the saw, and having an indicator face that is rearwardly oriented relative to said saw housing and vertically oriented when said saw blade is vertically oriented, said bubble level indicating device comprising a frame having a cup-shaped housing with a base end and an open end, a mounting arm projecting outwardly from one side of said cup-shaped housing, and a mounting ear projecting outwardly from another side of said cup-shaped housing, said mounting ear and mounting arm each having an opening therethrough receiving a fastener used in the assembly of the saw, whereby the level indicating device may be secured to the saw without requiring modification to the saw or the use of extra fasteners.

* * * * *